Figure 1:
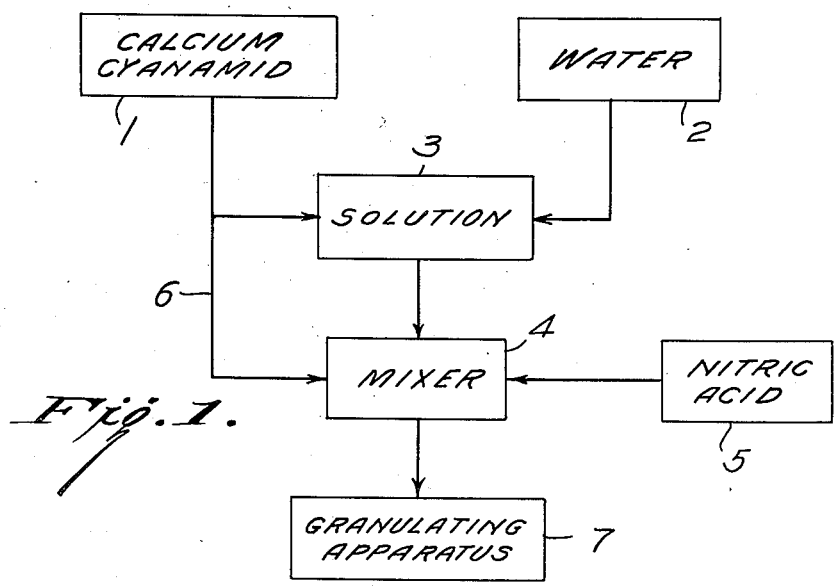

March 31, 1936. G. E. COX 2,035,866
METHOD OF GRANULATING FERTILIZER
Filed May 2, 1932

INVENTOR.
GEORGE E. COX,
BY
ATTORNEY

Patented Mar. 31, 1936

2,035,866

UNITED STATES PATENT OFFICE 2,035,866

METHOD OF GRANULATING FERTILIZER

George E. Cox, Niagara Falls, N. Y., assignor to American Cyanamid Company, New York, N. Y., a corporation of Maine Application May 2, 1932, Serial No. 608,734

7 Claims. (Cl. 71—9)

This invention relates to compositions of matter more particularly compositions containing nitrogenous substances.

I have devised a method of granulating nitrogenous substances and have thereby produced new granulated products which are particularly adapted for use as fertilizers and have filed applications for patent thereon as follows: Serial No. 607,790, filed April 27th, 1932, entitled Granulated cyanamid; Serial No. 607,792, filed April 27th, 1932, entitled Granulating calcium nitrate and method of producing the same. I have described various materials for use in said method which act as binder or agglomerating agents for the materials to be granulated.

The present invention relates to a new binding agent for this purpose and for other purposes, which is cheap and effective, and which can be made in large quantities with the aid of simple apparatus and unskilled labor.

In my co-pending applications I have mentioned the use of calcium nitrate as a binder. I do not need the usual market form of nitrate, but can use a solution of nitrate. This can be made by neutralizing nitric acid by lime, either oxide, hydrate or carbonate, and the solutions so made used directly in the granulating process.

I can use instead of lime the crude or the hydrated calcium cyanamid. The crude calcium cyanamid contains calcium cyanamid, free lime, carbon, and various minor impurities not of importance in my process. To use this crude cyanamid I use a suitable tank, acid resistant to dilute nitric acid and nitrate solutions, and provided with an agitator and means for cooling and controlling the temperatures of the solution. Into this tank I start with a little water and feed in continuously a stream of nitric acid and crude cyanamid so that the liquid in the tank is always acid. I continue this feeding of acid and cyanamid until the tank is nearly full, regulating the amount of water added as such, or the dilution of the nitric acid, so as to make a solution of nitrate of calcium of proper strength for the subsequent granulating process.

I maintain the temperature of the solution in the tank at a proper temperature preferably between 50° and 80° C. by suitable circulation and cooling.

The cyanamid is hydrolized in this treatment, the calcium either as cyanamid or free lime being transformed into calcium nitrate by the excess of acid present and the nitrogen of the cyanamid is at least in part transformed into urea and goes into solution with the calcium nitrate. The carbon and other insoluble impurities remain in the solution as slurry and do not interfere with the subsequent use of the product as a binder.

When the tank is nearly full and reactions are complete I finally neutralize the solutions with more cyanamid, in which case the nitrogen of the last additions will not be transformed to urea, or I may add lime for such final neutralization, after which the solution is ready for the granulation process.

More specifically my new binding material is made as follows:

Into an acid proof tank provided with agitator and cooling coils I charge a small amount of solution from a previous batch of neutralized liquor. I agitate this continuously and feed in a dilute nitric acid of from 50° to 60° strength. After I am assured of an excess of acid present I begin feeding in cyanamid in powdered form. This may be ground cyanamid from the electric furnaces, or it may be this same cyanamid after a hydration or water treatment to remove any residual carbide, for example, as described in my copending application Serial No. 608,735, filed May 2nd, 1932, entitled Method of hydrating calcium cyanamid, I maintain the temperature of the solution in the mixing tank at around 65° C. but depending on the size of the apparatus and the rate at which production is desired. This may actually vary between 50° C. and 80° C., or even up to 100° C.

When cyanamid is charged into an acid solution the acid combines with the lime present forming the corresponding salt, in this case calcium nitrate. The cyanamid is set free as such, $H_2CN_2$, and in acid solution this hydrolizes to urea.

$$H_2CN_2 + H_2O = (NH_2)_2CO$$

and goes into solution.

As this hydrolysis takes place only in an acid solution, I finally stop the cyanamid additions before neutrality, complete hydrolysis of all cyanamid added and finally neutralize with lime to complete neutrality.

The speed of the cyanamid hydrolysis increases rapidly with increased temperature. It becomes almost instantaneous at temperatures just below 100° C.; it is quite slow, requiring more than an hour at 50° C. I can operate between these temperatures so as to meet the demands of my apparatus for producing the binder at a wide range of varying capacity. The quantity of free acid present also has an influence on this hydrolysis so that by regulating free acid as well as temperature I can have complete control of my production.

It is important in this process that the rate of addition of the nitric acid and of the cyanamid should be such as to keep the solution cool. In all cases the solution should not rise above 100° C. and preferably it should be kept below 80° C. It is desirable to limit the temperature to even lower points and if conveniently possible the temperature may be kept down below 40° C. If the temperature is allowed to rise too high, decomposition sets in with transformation of cyanamid into ammonia which volatilizes and is lost. In addition high temperatures are favorable to certain other reactions which change the cyanamid to undesirable forms of nitrogen. In operating my process I have found it possible to operate within the limits of zero degrees to 100° C., but in large scale operations it is probably better to limit the temperature range of the solution to from 40° C. to 80° C. It is, of course, desirable to operate as near the lower limit as practicable.

The nitric acid and the cyanamid are added to the solution at the same time maintaining the solution slightly acid until the desired concentration of soluble nitrogenous substances is obtained. For the purpose of granulating substances I have found that the concentration of nitrogen may be between 1% and 18% or even somewhat higher. In actual practice on a large scale I find that a concentration between 10% and 14% of total nitrogen is perfectly satisfactory.

In order to obtain the higher concentrations of nitrogen in solution, the nitric acid which I use should be concentrated acid, say 36° Bé. Even if lesser concentrations of nitrogen in solution are to be eventually had, it is still preferable to use a concentrated nitric acid as it is simpler to first make a high concentration of nitrogen in solution and then dilute the same to the desired point with water, rather than to depend upon the water in the nitric acid and the water formed by chemical reaction to give the desired concentration.

The products obtained by this process are suitable for addition to say calcium cyanamid in the process of granulating the same, or to calcium nitrate in a process of granulating, or to a mixture of calcium cyanamid and calcium nitrate in granulation thereof. The product is furthermore useful in various other relations as will be apparent to those skilled in the art.

In making my binding solutions I have been able to control the process to such an extent that very little formation of undesirable forms of nitrogen, such as dicyandiamid, takes place. With reasonable control of my method the solution containing high concentrations of total nitrogen still contains no more than .5% of dicyandiamid and other undesirable forms of nitrogen. With proper control there is no difficulty in keeping the dicyandiamid as low as .1%.

Figure 2:
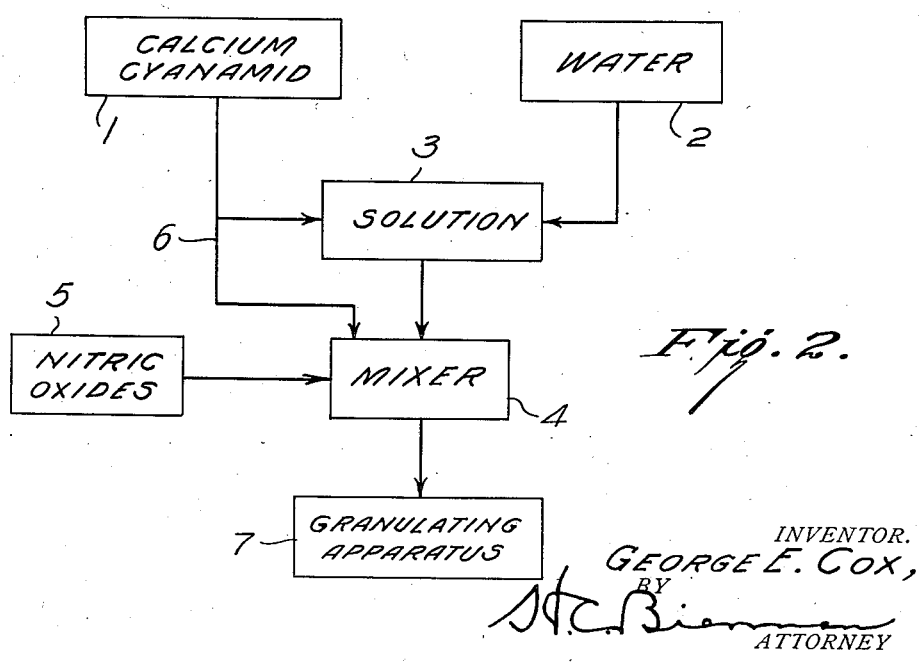

In the accompanying drawing constituting a part hereof and in which like reference characters indicate like parts;

Figure 1 is a flow sheet showing my method of producing a binding material for use in granulation, and Figure 2 is a similar flow sheet illustrating a slight modification of my method.

As will be seen from Figure 1 I take calcium cyanamid 1, either in the crude state or in the hydrated condition, and mix it with water 2, to provide a thin solution or slurry 3. The solution is then placed in a mixer 4 where nitric acid 5 is added with stirring in said mixer to render the solution slightly acid. Thereafter more nitric acid 5 and calcium cyanamid 6 are added to mixer 4 with continuous stirring to quickly and thoroughly incorporate the same in the solution. The complete solution containing the desired amount of nitrogen therein is then introduced into the granulating apparatus 7 which is more completely described in my copending application, Serial No. 607,791, filed April 27, 1932, entitled Method of granulating cyanamid.

In accordance with the modification of Figure 2, the nitric acid is replaced by oxides of nitrogen which may be obtained from various sources such as from the arc-process of fixing the nitrogen of the air, or from oxidation of ammonia by means of a platinum or other catalyst. The oxides 5 are introduced into the mixer 4 which contains the solution 3 of cyanamid 1 and water 2. Together with these oxides or alternately therewith is added more cyanamid 6. The oxides of nitrogen containing excess oxygen are absorbed in the mixer 4, forming nitric acid and nitrous acid which take part in the various reactions. The oxygen present tends to oxidize the nitrous acid to nitric acid.

The principal reactions taking place are, first in the solution of the calcium cyanamid in water wherein it reacts with the water to give calcium acid cyanamid and calcium hydroxide. This solution when mixed with nitric acid reacts with the calcium acid cyanamid to give calcium nitrate and free cyanamid, and also the calcium hydroxide reacts to give calcium nitrate and water. These reactions may be written as follows:

$$2CaCN_2 + 2H_2O = Ca(OH)_2 + Ca(HCN_2)_2$$
$$Ca(HCN_2)_2 + 2HNO_3 = Ca(NO_3)_2 + 2H_2CN_2$$
$$Ca(OH)_2 + 2HNO_3 = Ca(NO_3)_2 + 2H_2O$$

Although I have described my invention setting forth a single embodiment and a slight modification thereof, it is to be understood that my invention is not limited to the exact process described, nor to the details thereof, nor to the proportions of various ingredients or the concentrations of the final solutions. My invention is to be construed broadly and to be considered in conjunction with the related inventions of my copending applications referred to herein. The scope of the invention is not to be limited except in accordance with the claims appended hereto.

In the claims, where the expression "fertilizer substances which are subject to physical deterioration" is used, it is intended to mean those fertilizer substances which are subject either to dusting or caking or both.

What I claim is:

1. In a method of granulating solid cyanamid substances, the step which comprises adding to dry calcium cyanamid a solution containing calcium nitrate and urea.

2. In a method of granulating solid cyanamid substances, the step which comprises adding to dry calcium cyanamid a solution containing calcium nitrate and urea, said solution containing not over .5% of dicyandiamid nitrogen.

3. In a method of granulating solid nitrogenous substances suitable for use as fertilizers, the step which comprises adding to said solid nitrogenous substances a solution obtained by introducing equimolecular proportions of nitric acid and calcium cyanamid into a solution which is acid in character while maintaining the temperature below 100° C.

4. The method of granulating dry, crystalline, nitrogenous fertilizer substances which are subject to physical deterioration, which comprises adding to the dry substance a solution containing the reaction products of calcium cyanamid and nitric acid, said solution containing not over .5% of dicyandiamid nitrogen, said solution being used in amounts sufficient to act as a binder, and granulating the mixture.

5. The method of granulating dry, crystalline, nitrogenous fertilizer substances which are subject to physical deterioration, which comprises adding to the dry substance a solution containing the reaction products of calcium cyanamid and nitric acid, said solution containing not over .5% of dicyandiamid nitrogen and from 1 to 18% total nitrogen, said solution being used in amounts sufficient to act as a binder, and granulating the mixture.

6. The method of granulating dry, crystalline, nitrogenous fertilizer substances which are subject to physical deterioration, which comprises adding to the dry substance a solution containing the reaction products of calcium cyanamid and nitric acid, said solution containing from .1% to .5% of dicyandiamid nitrogen, said solution being used in amounts sufficient to act as a binder, and granulating the mixture.

7. The method of granulating dry, crystalline, nitrogenous fertilizer substances which are subject to physical deterioration, which comprises adding to the dry substance a solution containing the reaction products of calcium cyanamid and nitric acid, said solution containing from .1% to .5% of dicyandiamid nitrogen and from 10 to 14% total nitrogen, said solution being used in amounts sufficient to act as a binder, and granulating the mixture.

GEORGE E. COX.